Nov. 14, 1961 R. J. WENTE 3,008,515
FUEL CONTROL
Filed May 28, 1957 2 Sheets-Sheet 1

INVENTOR.
Robert J. Wente
BY
Paul Fitzpatrick
ATTORNEY

United States Patent Office 3,008,515
Patented Nov. 14, 1961

3,008,515
FUEL CONTROL
Robert J. Wente, Indianapolis, Ind., assignor to General Motors Corporation, Detroit, Mich., a corporation of Delaware
Filed May 28, 1957, Ser. No. 660,494
17 Claims. (Cl. 158—36.4)

My invention relates to fuel controls for gas turbine engines, particularly aircraft engines.

The purpose of the invention is to provide improved control of the fuel at low power settings of the engine. The principal advantage of the control according to the invention is that it provides a more accurate control of engine power output and holds the power substantially constant at low power settings such as are used in the landing approach of an aircraft. Another advantage of the invention is that it provides protection against flameout of the engine at low power settings.

The invention preserves the advantages of the highly developed main engine fuel control which is retained for controlling starting and acceleration of the engine, operation at the higher power settings, and deceleration.

By way of background, it may be stated that the main fuel control of a gas turbine is principally concerned with maintaining a desired turbine temperature and preventing excessive turbine temperature. This may be accomplished by direct measurement of the turbine inlet temperature and metering of fuel in response to the measurement. It may be done indirectly by measuring such quantities as compressor inlet ram pressure or compressor outlet pressure, compressor inlet temperature, and engine shaft speed, and deriving from these quantities, by a computing mechanism, the proper setting of a fuel metering valve to produce the desired turbine temperature. My invention is preferably used in combination with a main fuel control which combines the control by direct measurement of turbine temperature and the indirect control from other quantities referred to above. A main fuel control of this type, since it must handle large fuel flows for full power engine operation, is lacking in precision of fuel metering at the low flows required for flight idle operation during a landing approach. Also, by the nature of such controls, they vary the engine power output as ambient temperature and pressure and forward speed of the aircraft change, which is undesirable in a landing approach. They may also, in response to a control malfunction, momentarily cut off the fuel to the engine when it is operating at a low power setting, thus stopping combustion.

According to my invention, a second fuel control is provided which is particularly adapted to handle small fuel flows, such as occur at idling operation, and which responds to the controlling factors in such a way that engine power output is held constant rather than turbine temperature. This presents no hazard to the turbine, since the temperature level at idling power levels is much below the maximum allowable and the low power fuel control cannot supply a dangerous quantity of fuel.

The low power fuel control according to the invention meters fuel to the engine in response to the values of ambient air pressure, apart from any ram effect, and the temperature of the air entering the engine. With fuel metering based on and compensated for these factors, the engine power output can be held very closely constant at a low level notwithstanding variations in ambient temperature and aircraft speed.

The control system according to the invention also preferably includes an engine speed-responsive valve which cuts off the low power fuel control at speeds below the idling operational speed of the engine, such as are encountered only when the engine is being started, so that starting may be accomplished under control of the main fuel control, which includes mechanisms to assure satisfactory starting.

The nature of the invention and the advantages thereof will be apparent to those skilled in the art from the succeeding detailed description of the preferred embodiment of the invention and the accompanying drawings thereof.

Figure 1:
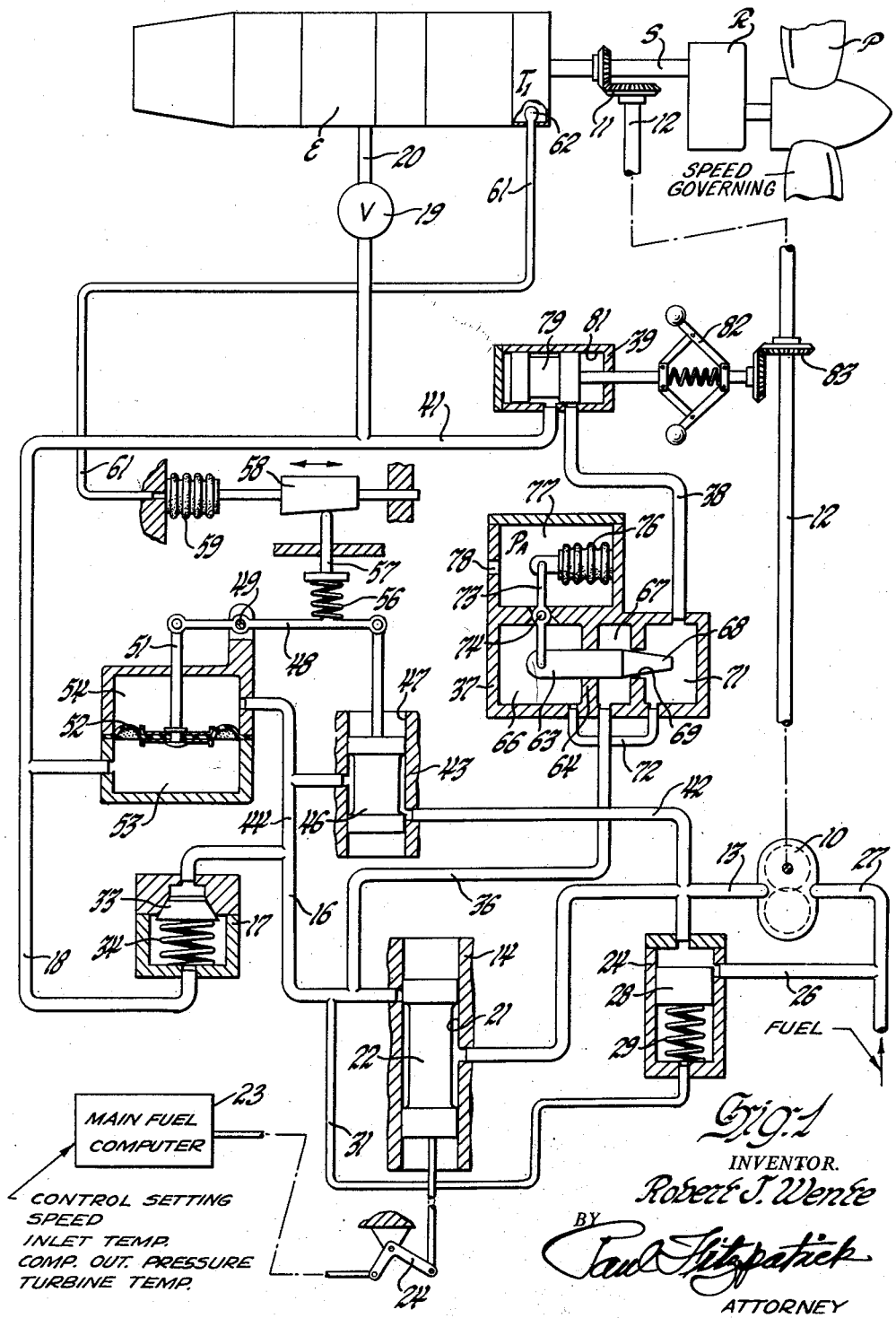
FIGURE 1 is a schematic diagram of a fuel control system connected to a turboprop aircraft engine.

Referring to FIGURE 1, there is illustrated a gas turbine engine E, of any suitable structure, which is coupled to a speed-governing propeller P through a shaft S and a reduction gear R. Fuel is supplied to the engine by a pump 10 driven from the engine through gears 11 and shaft 12. The normal path of fuel from the pump to the engine is through a line 13, a main fuel metering valve 14, line 16, a resistance valve 17, line 18, a fuel shutoff valve 19, and line 20, which is connected to the fuel nozzles (not shown) of the engine.

Since the main fuel control is well known, it is shown here only diagrammatically in the interest of conciseness and clarity. It is illustrated sufficiently to show the relation therewith of the present invention. The main metering valve 14 is illustrated as comprising a sleeve or cylinder 21 and a valve spool 22 slidable in the cylinder. As illustrated, the spool 22 has closed the outlet line 16. The spool is moved upwardly to supply fuel to the engine by a control mechanism indicated as a main fuel computer 23 connected through a bellcrank 24 to the spool 22. The main fuel computer responds to the control setting, which is the setting of the pilot's power control lever, to speed, which is the rotational speed of the engine, to inlet temperature, which is the temperature of the air entering the engine, to compressor outlet pressure, which is the pressure of the air delivered by the compressor of the gas turbine, and to turbine temperature, which preferably is the temperature of the combustion gases entering the turbine. Ram air pressure in the engine inlet may be, and frequently is, used for control instead of compressor outlet pressure. The computer opens the fuel valve 14 by an amount sufficient to pass the desired or computed quantity of fuel to the engine. The metering head across valve 14 is maintained constant at a suitable value, such as 30 lbs. per sq. in., by a bypass valve 24 which bypasses fuel from the pump outlet line 13 into a line 26 connected to the pump inlet line 27. The bypass valve comprises a throttling piston 28 biased downwardly, as shown, to open the bypass by pressure in line 13 ahead of metering valve 14 and biased upwardly to close the bypass by a spring 29 and by pressure in the outlet of the metering valve communicated from line 16 through a pressure connection 31. The actual structure of such controls is quite complex and, since it is understood by those skilled in the art, there is no need to enter into a discussion of the details of such a control.

The valve 19 is a standard element which is provided to shut off completely the flow of fuel to the engine. It is always fully open when the engine is in operation. The resistance valve 17 serves to transfer control of fuel from the main metering valve 14 to the small flow control of the invention when the metering valve 14 is nearly closed. Valve 17 is a valve of known type in which a plug 33 is urged against a seat by a compression spring 34. Valve 17 thus maintains a substantially constant pressure drop of preferably about 15 lbs. per sq. in. between lines 16 and 18 when the flow opens the valve. If the pressure difference between lines 16 and 18 is insufficient to overcome spring 34, the valve will close and prevent flow from the main metering valve through line 18 to the engine. Valve 17 will close at small flow rates because there is an alternate path from line 16 to the engine through the lower power fuel control of the invention.

This path comprises a line 36 branching off the main metering valve outlet line 16, an aneroid controlled throttling valve 37, a line 38, a speed controlled cutoff valve 39, and line 41 connected to line 18. There is also a bypass around the main metering valve from line 13 through line 42, a makeup valve 43, and branch line 44 connected to line 16. The makeup valve 43 may comprise a spool 46 slidable in a cylinder 47 and operative to throttle flow between lines 42 and 44. Spool 46 is moved by a rocker arm 48 pivoted at 49 and connected through a stem 51 to a flexible diaphragm 52. Chamber 53 below diaphragm 52 is connected to line 18, which is at the pressure P3 of fuel supplied to the engine. Chamber 54 above the diaphragm is connected to line 44, and thus is at the pressure P2 in lines 44, 16, and 36. The difference between P2 and P3 is the head which causes fuel to flow through throttling valve 37 when cutoff valve 39 is open.

Rocker arm 48 is biased by a comparison spring 56 acting to bias makeup valve 43 toward open position. The spring 56 is variably loaded by slidably mounted cam follower 57 actuated by a reciprocable cam 58. The position of cam 58 is determined by temperature-responsive bellows 59 connected to the cam and connected through line 61 to the inlet temperature-sensing bulb 62 in the inlet of the engine. The function of the makeup valve will be clarified later, but it may be pointed out at this time that it passes fuel when the main metering valve 14 is closed and it controls the pressure drop through throttling valve 37.

Throttling valve 37 comprises a valve plunger 63 slidable in a wall 64 between chambers 66 and 67 and including a contoured metering valve portion or needle 68 so-operating with a metering orifice 69 between chamber 67 and chamber 71. The inlet line 36 to the valve is connected to chamber 67 and the outlet line 38 is connected to chamber 71. Chamber 71 is connected to chamber 66 through line 72 to balance the pressures on the ends of the plunger 63. Plunger 63 is actuated by a rocker arm 73 pivoted at 74 in the valve body and actuated by an evacuated bellows or aneroid 76. Bellows 76 is mounted in a chamber 77 to which air at ambient static atmospheric pressure (not ram pressure) is admitted through an opening 78. The position of valve plunger 63 and the amount of opening of the valve orifice is thus determined by ambient pressure. The relation between ambient pressure and the size of the opening is determined by the contour of needle 68.

The cutoff valve 39 is provided as an automatic means to disable the low power fuel control during starting of the engine. It comprises a valve spool 79 reciprocable in a cylinder 81 under control of speed-responsive device 82 driven by shaft 12 through gears 83. The valve is shown in the closed position. As the engine approaches the operating speed range, the flyball device 82 opens valve 39 so that it has no effect on the fuel system during operation of the engine, once it has been started.

The manner in which the low power fuel control operates may be described by assuming that the engine is in normal operation at a cruise power level and the power is reduced for landing. It is customary in landing turboprop aircraft engines to reduce the shaft horsepower of the engines to a value slightly less than zero, which is referred to as the "flight idle" operating condition of the engine, with the propeller governing engine speed. The reason for operating the engine at a negative power output is that the landing is facilitated if the engine exerts a slight drag on the aircraft rather than propelling it forward. The negative horsepower is not great. In an engine rated at 3,500 shaft H.P. maximum, the flight idle output might be about minus 250 H.P. Obviously, the fuel requirement for this low output is much less than that for full power, roughly a third as much.

If the engine is in normal flight, the main fuel computer will be set to a level toward the top of the power output range and the main fuel control will be metering fuel to maintain a turbine temperature near the maximum. Fuel will flow from pump 10 through the main metering valve 14 and resistance valve 17 to the engine. The excess discharge from the pump will be returned to the pump inlet through the bypass valve 28 which holds the metering drop across valve 14 constant.

Now, if the power control is moved toward a lower power setting, the valve 14 will be moved toward closed position and the engine power output will decrease. At all times, in addition to the fuel flowing through resistance valve 17 and line 18, some fuel will also be flowing through line 36, valve 37, line 38, valve 39, and line 41. This does not affect the amount of fuel supplied to the engine in normal operation, since the fuel has already been metered by valve 14. However, as the fuel rate decreases, a flow rate will be reached at which all the fuel can flow through valve 37 at the metering head established by the resistance valve 17 and the resistance valve will be closed. When the main control is set to flight idle, the main metering valve will close entirely. When the main valve is closed, fuel flows to the engine through line 42, makeup valve 43, lines 44, 16, and 36, and throttling valve 37. Valve 46 is referred to as a "makeup" valve because it supplies or makes up a sufficient quantity of fuel to operate the engine at flight idle if the main metering valve does not supply it. Valve 43 can do this if the main metering valve is nearly but not quite closed, and the main valve need not be entirely closed at flight idle, so long as it is so nearly closed that valve 17 closes.

As previously pointed out, spring 56 tends to open makeup valve 43, which is a balanced valve. The difference between P2 and P3, which is the metering head across throttling valve 37, tends to close valve 43. If the main metering valve 14 closes and valve 43 is closed, there is no flow through valve 37 or through valve 17, and thus P3 rises to equal P2. This allows spring 56 to open valve 43 and the resulting pressure drop across valve 37 acts to close valve 43 in opposition to spring 56. Thus, for any given loading of spring 56, valve 43 will automatically open sufficiently to maintain a predetermined pressure drop between P2 and P3 across the throttling valve 37. If sufficient fuel is passed by the metering valve to maintain this pressure differential, the makeup valve will close. The value of the pressure differential between P2 and P3 is therefore controlled by the loading of spring 56, which is varied by engine inlet temperature, sensed by bulb 62, and acting through temperature bellows 59, cam 58, and follower 57. Thus, the pressure drop across the metering orifice 69 is controlled by inlet temperature.

This is one of the two factors which determines flow through valve 37, the other being the opening of the orifice by needle 68. As previously explained, this opening is a predetermined function of ambient atmospheric pressure as a result of the operation of the plunger 63 by the aneroid 76 and the predetermined contour of the needle. The flow to the engine is, therefore, determined by ambient pressure and inlet temperature. These two factors are particularly suited to maintain constant engine power output notwithstanding changes in forward speed of the aircraft, ambient pressure, and ambient temperature.

Therefore, when the engine control is set to flight idle during a landing approach, the low power fuel control takes over from the main fuel control and holds the engine quite accurately at the desired flight idle power output.

It will be understood, of course, that the contours of cam 58 and valve needle 68 will be determined for any given installation to fit the characteristics of the particular engine, which will vary from one model of engine to another. It is possible to determine by tests the desired fuel flow to maintain the desired flight idle power output as a function of ambient pressure and inlet temperature and to shape the cam 58 so that it maintains power substantially constant by varying the flow as necessary to compensate for changes in inlet temperature. Likewise, needle 68 is contoured so that the effective area of the orifice varies to regulate the flow so that it is varied in such a way as to maintain the power constant notwithstanding changes in ambient pressure.

Figure 2:
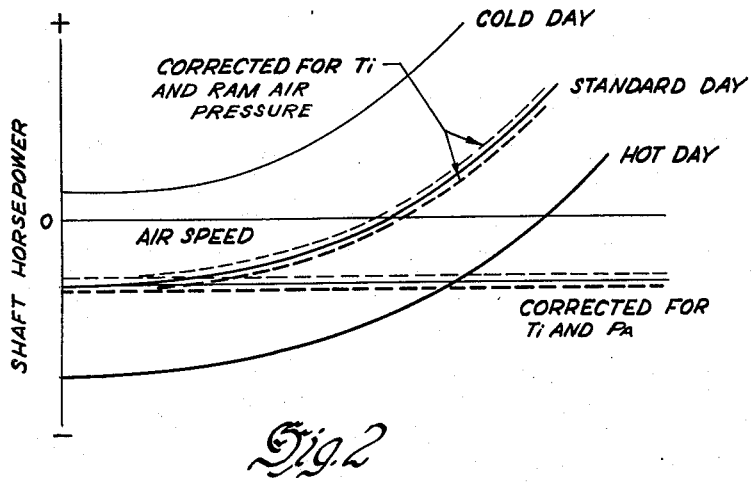
FIGURE 2 is a graphical illustration of the functioning and advantages of the control.

The curves of FIGURE 2 illustrate the advantages of my control as applied to an example of a turboprop engine. FIGURE 2 illustrates the variation of engine shaft horsepower with air speed and inlet air temperature, for a low power setting of the main engine control. Air speed, which is the forward speed increasing the compressor inlet pressure, tends to increase power output. With a control which tends to maintain constant turbine temperature, the power increases as the air speed increases. This is characteristic of the main fuel control. However, the low power fuel control, which responds to static ambient pressure, does not change power with changes in forward speed. Also, the power level is greater as ambient temperature is lower when turbine temperature is held constant, as it is by the main control. Thus, the curve "cold day" illustrates the relation of power output to air speed on a very cold day. The curve identified as "standard day" is a similar curve at standard atmospheric temperature, and the curve identified as "hot day" shows the power curve on a very hot day. As will be apparent, regardless of the temperature, the power level curve goes up with increase in air speed. Also, the overall ordinates of the curve are depressed as ambient temperature increases.

The desired result is to eliminate these variations. By suitably correcting the fuel flow for engine inlet temperature, as indicated by the dotted lines identified as "corrected for $T_i$," the power level can be held substantially constant regardless of variations in ambient temperature, but the disturbing effect of aircraft speed remains. If compensation for the pressure of the air is made by metering fuel in accordance with static ambient pressure (rather than ram pressure or compressor discharge pressure as in the typical main fuel control) so that the ram effect of forward speed of the aircraft does not increase the fuel flow, the power may be held substantially constant as indicated by the lines "corrected for $T_i$ and $P_A$." The power is held very closely to the desired slightly negative flight idle value and is not significantly changed by changes in temperature of the air as the plane approaches the ground or decreases in speed as the landing approach is made.

Considering FIGURE 2 in terms of the system shown in FIGURE 1, the function of the cam 58 is to make the correction for inlet temperature and the function of needle 68 is to make the correction for air pressure.

Since a set of characteristic curves of power output as a function of ambient pressure and inlet temperature can be made for any engine, the proper contours of the cam 58 and the needle 68 can be determined.

Figure 3:
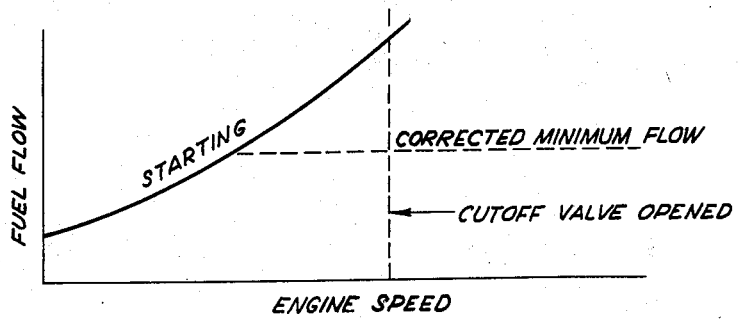
FIGURE 3 is a graphical representation of the significance of the low speed cutoff.

FIGURE 3 illustrates the reason for the starting cutoff valve 39. This figure shows the fuel flow required in starting the engine as a function of engine speed. At the beginning of the introduction of fuel during starting, the fuel flow is below the corrected minimum flow which would be established by the low power fuel control. As the starting cycle progresses, the fuel rises above the corrected minimum flow line. Somewhere in this range, as indicated by the vertical dotted line, the cutoff valve 39 is opened, activating the small flow fuel control. This is at a speed below the flight idle operating speed of the engine. In this connection, the flight idle operating speed may be the same as full power operating speed and, in most cases, will be near the full operating speed.

The advantages of the small flow control may be reviewed briefly. They make it possible for the pilot to be assured of constant power output from each engine and equal power outputs from all engines during the landing approach at the value established as most desirable. The low power fuel control also maintains fuel flow to the engine at a value sufficient to maintain combustion even if the main metering valve closes. If the power lever is set at a low level, the metering valve will be nearly closed. Under these conditions, it is possible for a control malfunction to cause the main metering valve to close momentarily. If it were not for the low power fuel control which maintains the flow, this would temporarily interrupt flow to the endine. This would cause the flame to go out in the engine and resumption of fuel flow would not re-establish combustion. A power failure for this reason during a landing might result in a casualty.

It will be apparent that any suitable valve mechanism such as a manually operated valve could be used to cut out the low power fuel control for starting purposes. It will also be apparent that other fuel metering arrangements responsive to inlet temperature and ambient pressure could be substituted for the preferred arrangement illustrated and described. In particular, the functions of inlet temperature and ambient pressure could be reversed so that inlet temperature controls the throttling valve opening and ambient pressure controls the metering head across this valve. The arrangement shown is preferred, however.

The description of the preferred embodiment of the invention for the purpose of explaining the principles thereof is not to be construed as limiting or restricting the invention, since many modifications may be made by the exercise of skill in the art within the scope of the invention.

I claim:

1. A fuel system for a gas turbine engine comprising, in combination, means for supplying fuel, a main fuel control adapted to meter fuel for varying engine power requirements up to maximum power requirement, and a low power fuel control responsive to ambient atmospheric pressure and engine inlet temperature adapted to meter fuel so as to maintain power substantially invariant with ambient atmospheric conditions at a low power level, the main and low power fuel controls being connected in parallel between the fuel supplying means and the engine.

2. A fuel system for a gas turbine engine comprising, in combination, means for supplying fuel, a main fuel control adapted to meter fuel for varying engine power requirements up to maximum power requirement, a low power fuel control adapted to meter fuel variably so as to maintain power substantially invariant with ambient atmospheric conditions at a low power level, the main and low power fuel controls being connected in parallel between the fuel supplying means and the engine, means operative to disable the main fuel control below a predetermined fuel flow rate, and means responsive to a condition of engine operation operative to disable the low power fuel control for starting the engine.

3. A fuel system for a gas turbine engine comprising, in combination, means for supplying fuel, a main fuel control adapted to meter fuel for varying engine power requirements up to maximum power requirement, a low power fuel control adapted to meter fuel so as to maintain power substantially invariant with ambient atmospheric conditions at a low power level, the main and low power fuel controls being connected in parallel between the fuel supplying means and the engine, means responsive to fuel flow rate through the low power fuel control operative to disable the main fuel control below a predetermined engine power level, and means responsive to engine speed operative to disable the low power fuel control for starting the engine.

4. A fuel system for a gas turbine engine comprising, in combination, means for supplying fuel; a main fuel control connected between the supplying means and the engine adapted to meter fuel up to the maximum engine demand; and a low power fuel control capable of metering sufficient fuel for engine operation near zero power output connected between the supplying means and the engine, the low power fuel control comprising fuel metering means responsive to engine inlet temperature and ambient atmospheric pressure operative to maintain engine power output substantially invariant with changes in said temperature and pressure at a predetermined idling power output level.

5. A fuel system for a gas turbine engine comprising, in combination, means for supplying fuel; a main fuel control connected between the supplying means and the engine adapted to meter fuel up to the maximum engine demand; and a low power fuel control capable of metering sufficient fuel for engine operation near zero power output connected between the supplying means and the engine, the low power fuel control comprising, in series, a makeup valve and a throttling valve, means responsive to engine inlet temperature, and means responsive to ambient atmospheric pressure, each of said means controlling one of said valves.

6. A fuel system for a gas turbine engine comprising, in combination, means for supplying fuel; a main fuel control connected between the supplying means and the engine adapted to meter fuel up to the maximum engine demand; and a low power fuel control capable of metering sufficient fuel for engine operation near zero power output connected between the supplying means and the engine, the low power fuel control comprising, in series, a makeup valve and a throttling valve, means responsive to engine inlet temperature and the pressure drop across the throttling valve connected to the makeup valve so as to open the makeup valve to maintain a pressure drop varied by inlet temperature across the throttling valve, and means responsive to ambient atmospheric pressure connected to the throttling valve to open the valve as a function of atmospheric pressure.

7. A fuel system for a gas turbine engine comprising, in combination, means for supplying fuel; a main fuel control connected between the supplying means and the engine adapted to meter fuel up to the maximum engine demand; and a low power fuel control capable of metering sufficient fuel for engine operation near zero power output connected between the supplying means and the engine, the low power fuel control comprising, in series, a makeup valve, a throttling valve, and a cutoff valve, means responsive to engine inlet temperature and the pressure drop across the throttling valve connected to the makeup valve so as to open the makeup valve to maintain a pressure drop varied by inlet temperature across the throttling valve, means responsive to ambient atmospheric pressure connected to the throttling valve to open the valve as a function of atmospheric pressure, and means responsive to engine speed connected to the cutoff valve adapted to close the cutoff valve at a speed below normal engine operating speed.

8. A fuel system for a gas turbine engine comprising, in combination, means for supplying fuel; a main fuel control connected between the supplying means and the engine adapted to meter fuel up to the maximum engine demand; and a low power fuel control capable of metering sufficient fuel for engine operation near zero power output connected between the supplying means and the engine, the low power fuel control comprising, in series, a makeup valve, a throttling valve, and a cutoff valve, means responsive to engine inlet temperature and the pressure drop across the throttling valve connected to the makeup valve so as to open the makeup valve to maintain a pressure drop varied by inlet temperature across the throttling valve, means responsive to ambient atmospheric pressure connected to the throttling valve to open the valve as a function of atmospheric pressure, and means responsive to engine speed connected to the cutoff valve adapted to close the cutoff valve at a speed below normal engine operating speed; and a resistance valve connected between the main fuel control and the engine.

9. A fuel system for a gas turbine engine comprising, in combination, means for supplying fuel; a main fuel control connected between the supplying means and the engine adapted to meter fuel up to the maximum engine demand; and a low power fuel control capable of metering sufficient fuel for engine operation near zero power output connected between the supplying means and the engine, the low power fuel control comprising, in series, a throttling valve and a cutoff valve, means responsive to ambient atmospheric pressure and temperature connected to the throttling valve to control the flow through the valve, and means responsive to engine speed connected to the cutoff valve adapted to close the cutoff valve at a speed below normal engine operating speed.

10. A gas turbine fuel control comprising, in combination, main fuel metering valve means adapted to supply fuel for varying engine operations from near idle to full power, including means for variably controlling the power output of the engine, and low power fuel throttling means adapted to supply fuel to the engine at a rate causing substantially constant power output of the engine at an idling level, means responsive to closing of the main fuel metering valve means connected to the low power fuel throttling means to activate the low power fuel throttling means, means sensitive to ambient atmospheric pressure and temperature, and means connecting the sensitive means to the low power fuel throttling means for control thereof; the sensitive means, the connecting means, and the low power fuel throttling means being so constructed as to vary fuel flow in response to the ambient atmospheric pressure and temperature so as to maintain engine power output at a substantially constant idling level, notwithstanding variation of the ambient pressure and temperature.

11. A fuel control as recited in claim 10 including means responsive to engine speed connected to the low power fuel throttling means adapted to shut off flow through the low power fuel throttling means when engine speed is below a predetermined value less than the normal operating speed of the engine.

12. A fuel control as recited in claim 10 in which the means responsive to closing of the main fuel metering valve means is a resistance valve connected in series with the main fuel metering valve means.

13. A gas turbine fuel system comprising, in combination, means for supplying fuel, a main fuel metering valve supplied thereby, and means connecting the metering valve to the engine adapted to provide a predetermined pressure drop in response to flow through the said connecting means, the main metering valve being dimensioned to supply the maximum fuel requirement of the engine, a first throttling valve connected in parallel with the main metering valve, a second throttling valve connected between the main metering valve and the engine, means responsive to the pressure drop across one throttling valve connected to the other throttling valve and actuating the said other throttling valve to control the pressure drop across the said one throttling valve, means responsive to ambient atmospheric pressure biasing one throttling valve, and means responsive to ambient atmospheric temperature biasing the other throttling valve, the throttling valves being so contoured that the throttling valves maintain a fuel flow compensated for ambient pressure and temperature so as to maintain engine power substantially constant at an idling level.

14. A gas turbine fuel system as recited in claim 13 in which the means responsive to ambient atmospheric temperature is connected to the first throttling valve and means responsive to ambient atmospheric pressure is connected to the second throttling valve.

15. A fuel system for a gas turbine engine comprising, in combination, means for supplying fuel; a main fuel control adapted to meter fuel up to the maximum engine demand including a main metering valve connected between the supplying means and the engine and a resistance valve connecting the main metering valve to the engine, the resistance valve opening in response to a predetermined pressure drop thereacross; and a low power fuel control capable of metering sufficient fuel for engine operation near zero power output, the low power fuel control comprising a first throttling valve connected in parallel with the main metering valve and a second throttling valve connected in parallel with the resistance valve, control means responsive to the ambient atmospheric values of pressure and temperature, respectively, one said control means being connected to each said throttling valve, means responsive to the pressure drop across the parallel resistance valve and second throttling valve connected to the first throttling valve biasing the first throttling valve in an opening direction in response to decrease in the said pressure drop, the said control means and the said throttling valves being so constructed as to regulate the fuel flow through the throttling valves to compensate the effects of ambient pressure and temperature on engine power to maintain a substantially constant low engine power output.

16. A fuel system for a gas turbine engine coupled to a variable load device including governing means adapted to vary the load imposed on the engine so as to maintain engine speed at a predetermined value, the fuel system comprising, in combination, means for supplying fuel; a main fuel control adapted to meter fuel up to the maximum engine demand including a main metering valve connected between the supplying means and the engine and a resistance valve connecting the main metering valve to the engine, the resistance valve opening in response to a predetermined pressure drop thereacross; and a low power fuel control capable of metering sufficient fuel for engine operation near zero power output, the low power fuel control comprising a first throttling valve connected in parallel with the main metering valve and a second throttling valve connected in parallel with the resistance valve, control means responsive to the ambient atmospheric values of pressure and temperature, respectively, one said control means being connected to each said throttling valve, means responsive to the pressure drop across the parallel resistance valve and second throttling valve connected to the first throttling valve biasing the first throttling valve in an opening direction in response to decrease in the said pressure drop, the said control means and the said throttling valves being so constructed as to regulate fuel flow through the throttling valves to compensate the effects of ambient pressure and temperature on engine power to maintain a substantially constant low engine power output.

17. A fuel system as recited in claim 16 including valve means responsive to engine speed connected in series with the low power fuel control and operative to shut off fuel flow through the low power fuel when engine speed falls substantially below the said predetermined speed.

References Cited in the file of this patent

UNITED STATES PATENTS

| | | |
|---|---|---|
| 2,422,808 | Stokes | June 24, 1947 |
| 2,545,698 | Holley et al. | Mar. 20, 1951 |
| 2,557,526 | Bobier et al. | June 19, 1951 |
| 2,600,612 | Bollo | June 17, 1952 |
| 2,638,739 | Barr | May 19, 1953 |
| 2,651,261 | Davies | Sept. 8, 1953 |
| 2,667,742 | Kuzmitz | Feb. 2, 1954 |
| 2,688,841 | Decher et al. | Sept. 14, 1954 |
| 2,689,606 | Mock | Sept. 21, 1954 |
| 2,772,728 | Malick | Dec. 4, 1956 |
| 2,796,136 | Mock | June 18, 1957 |

FOREIGN PATENTS

| | | |
|---|---|---|
| 727,201 | Great Britain | Mar. 30, 1955 |